United States Patent [19]

Moore, Jr. et al.

[11] 4,243,194
[45] Jan. 6, 1981

[54] HOT WATER TANK SUPPORTING LEGS

[75] Inventors: Henry J. Moore, Jr., Los Angeles; Myron E. Deneau, Malibu, both of Calif.

[73] Assignee: Mor-Flo Industries, Inc., Santa Monica, Calif.

[21] Appl. No.: 43,336

[22] Filed: May 29, 1979

[51] Int. Cl.³ .................................. F16M 11/20
[52] U.S. Cl. ............................ 248/188.1; 248/151
[58] Field of Search .............. 248/146, 151, 188.1, 248/188, 188.8, 188.9; 403/349, 348; 201/71

[56] References Cited

U.S. PATENT DOCUMENTS

| | | | |
|---|---|---|---|
| 779,924 | 1/1905 | Gammel | 248/146 X |
| 1,986,992 | 1/1935 | Wolfe | 248/146 X |
| 3,236,389 | 2/1966 | Murdock | 248/188 X |
| 3,564,984 | 2/1971 | Alexander | 403/348 X |
| 3,600,735 | 8/1971 | Jerabek | 403/348 X |
| 3,954,344 | 5/1971 | Nakama | 403/348 X |
| 4,101,232 | 7/1978 | Haapala | 403/349 X |

*Primary Examiner*—J. Franklin Foss

[57] ABSTRACT

Conventional type metal legs for the underpan of a hot water tank are eliminated and shorter legs in the form of integral plastic bodies substituted. The plastic bodies forming the legs are provided with diametrically opposite side slots for receiving inner edges of openings formed in the underpan to enable locking of the plastic bodies at points of the pan to serve as a support therefor. The material of the legs is of high heat insulation and portions of the legs protruding through the pan actually engage the underside of a hot water tank to hold it in spaced insulated relationship with respect to the pan.

3 Claims, 5 Drawing Figures

HOT WATER TANK SUPPORTING LEGS

This invention relates generally to hot water heaters and more particularly to improved supporting legs for the underpan of a hot water tank.

BACKGROUND OF THE INVENTION

Conventional hot water tanks are supported in a bottom pan in turn provided with metal legs for supporting the pan a given distance above a concrete floor or the ground. The fire box for the heater tank is normally in the under-central portion of the heater itself, the bottom pan upon which the tank sits overlying the underside of the heater. The supporting legs are generally in the form of angle irons which are welded or otherwise secured to the pan. These legs are generally six to eight inches long in order to provide a relatively large air space beneath the pan under the theory that the same should be heat insulated from the ground by such an arrangement.

In actuality, with the foregoing type of conventional support for the hot water tank, the metal tank itself is in direct conductive metallic contact with the underpan. The pan, also of metal, is in direct conductive metallic contact with the metal legs. Thus, a substantial portion of heat in the tank is passed by simple conductance through the bottom pan and legs to the ground, thereby resulting in heat loss and inefficiency. The supporting of the pan itself a relatively high distance above the ground on the theory that such will provide better heat insulation does not really provide any more appreciable insulation than were the pan supported a few inches off the ground. In fact, the closer the bottom of the tank is to the ground, up to a certain point, the better cooling effect can result from convection currents passing between the underside of the pan and the ground. Where the space is fairly confined, high velocity air tends to flow thereacross while a larger space holding the pan further above the ground results in a decreased velocity air flow or circulating air and thus less heat dissipation, thereby in actuality defeating the alleged purpose of high support for the heater pan.

BRIEF DESCRIPTION OF THE PRESENT INVENTION

With the foregoing considerations in mind, the present invention contemplates the provision of greatly improved supporting legs for hot water tanks wherein problems associated with present metallic type legs are avoided.

More particularly, the present invention provides at least three supporting legs for the bottom pan of a hot water heater, each supporting leg comprising a body of heat insulation material such as rigid plastic having slots formed in its opposite sides and an upwardly projecting portion on its top surface. The supporting pan for the tank in turn is provided with three non-circular symmetrically spaced openings for receiving the legs, each opening receiving a body when the body is oriented in a first position relative to the opening, edge portions of the opening being receivable in the slots respectively when the body is rotated to a second position relative to the opening. With this arrangement, the heat insulating body can be manually locked to the pan without requiring any special welding operation. Further, because the body is of heat insulating material such as plastic, substantially no heat conduction can take place through the leg.

An upper portion of the leg extending above the pan serves to receive and seat a peripheral portion of the hot water tank the upward projection indexing the tank relative to the center of the pan and also the top surface of each of the legs supporting the tank in insulated spaced relationship with respect to the pan itself. Thus, there is negligible heat conduction between the tank and the pan as well as between the pan and the ground.

Finally, the heat insulating legs themselves are made substantially shorter than conventional legs so that the pan is relatively close to the ground. This closeness has the advantage of further heat isolation from the ground or surroundings by faster convection currents passing beneath the pan thus maintaining the environment relatively cool. A further unexpected and surprising advantage of the shorter legs is the fact that shipping cartons for the heater can be made substantially shorter than heretofore required for conventional length legs. Finally, costs are substantially reduced since no welding or painting etc. is necessary in securing the legs to the supporting pan, this latter operation being carried out very simply without the need of special tools.

BRIEF DESCRIPTION OF THE DRAWINGS

A better understanding of this invention will be had by now referring to a preferred embodiment thereof as illustrated in the accompanying drawings in which.

DETAILED DESCRIPTION OF THE PREFERRED EMBODIMENT

Figure 1:
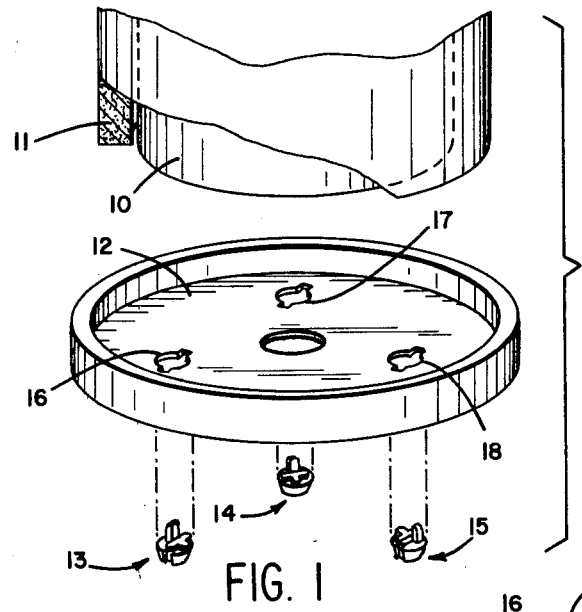
FIG. 1 is a broken away exploded perspective view of a typical hot water heater tank and the supporting pan and legs of this invention.

Referring first to FIG. 1, there is shown at 10 the lower portion of a hot water tank surrounded by the normal insulation jacket 11. Normally, the water tank 10 and insulation 11 will simply seat on a bottom pan 12 to which metal legs have been welded.

In accord with the present invention, there are provided improved supporting legs in the form of molded plastic bodies indicated generally by the arrows 13, 14 and 15 shown exploded away from the bottom of the pan 12. In accord with a further feature of this invention, the pan 12 is modified by the provision of a plurality of non-circular openings such as indicated at 16, 17 and 18 for receiving in interlocking relationship the legs 13, 14 and 15 respectively.

Each of the supporting legs as well as its cooperating opening in the bottom pan is identical and therefore a detailed description of one will suffice for all.

Figure 2:
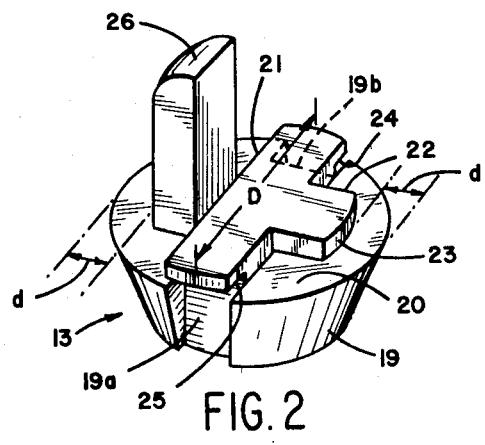
FIG. 2 is a greatly enlarged perspective view of one of the supporting legs illustrated in FIG. 1.

Referring specifically to FIG. 2, there is shown, by way of example, the supporting leg 13. This leg comprises a plastic body having a generally tapered cylindrical shape indicated at 19 with a circular top surface 20. Top surface 20 in turn has an integrally formed raised portion in the shape of a T, the cross section of the T being indicated at 21 running co-extensively with a diameter of the circular periphery of the top surface 20, and a stem portion 22 terminating at 23 short of the circular periphery of the top surface 20 by a given distance d.

Referring once again to the cross portion of the T shape, the ends of the cross portion have undercut slots indicated at 24 and 25, each of these slots extending radially inwardly a distance at least equal to the heretofore referred to given distance d.

In addition to the raised T shaped portion, the top surface 20 also includes an upwardly extending projection 26 adjacent to a mid part of the cross portion of the T on the side opposite the side of the stem 22. It will be noted as indicated in FIG. 2, that the far side of the upwardly extending projection 26 is spaced inwardly from the circular periphery of the top surface 20 by the same distance d as the inward spacing of the termination point 23 of the stem 22.

The configuration of the plastic body making up the tapered cylindrical leg 19 is completed by the provision of flats 19a and 19b on diametric opposite side portions of the tapered cylindrical body. These flats constitute manual gripping surfaces to facilitate insertion of the leg in the bottom pan structure 12 of FIG. 1 as will now be described with respect to FIGS. 3 and 4.

Figure 3:
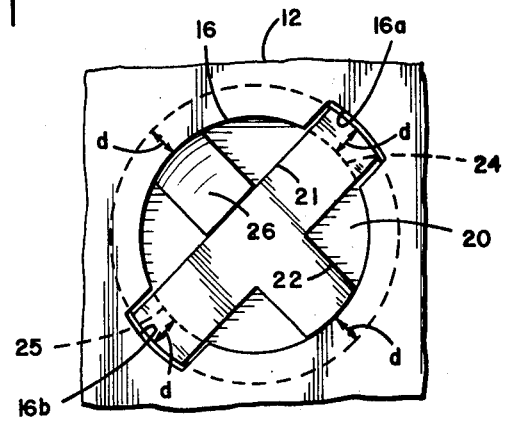
FIG. 3 is a top plan view illustrating a first position of the supporting leg in securing the same to the underpan.

Referring first to FIG. 3, the view is taken looking downwardly through the opening 16 of the pan 12 onto the top of the leg 13 described in FIGS. 1 and 2. It will be noted that the opening 16 has a radius less than the radius of the circular top surface 20 of the leg by an amount no greater than the heretofore referred to given distance d. Further, each opening has diametrically opposite notches 16a and 16b extending the opening in a diametric direction a distance at least equal to the diameter of the circular top surface 20 of the leg.

With the foregoing structure, the cross portion 21 of the raised T shape of the leg can be received up through the opening 16 with the ends of the cross portion received through the notches 16a and 16b. Further the stem portion 22 of the projection 26 will fit upwardly through the opening 16 since their dimensions are spaced inwardly from the top circular periphery by the distance d.

Figure 4:
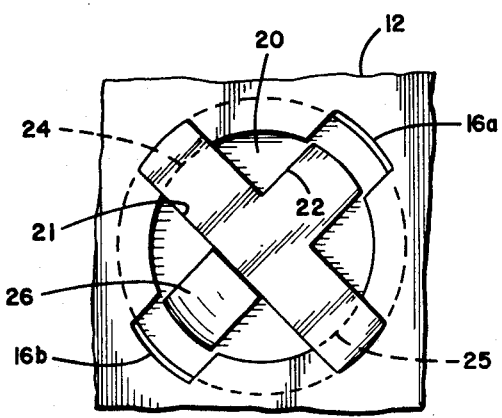
FIG. 4 is a view similar to FIG. 3 illustrating a second rotated position of the leg for securing the same to the supporting pan; and, FIG. 5 is a fragmentary cross section through one of the legs and the pan when the same is secured to the pan and functioning to support the hot water tank.

When the leg has been so inserted through the opening 16 as described in FIG. 3, the diametric opposite flats on the tapered portion 19 may be grasped manually from underneath and the entire leg rotated in a counter-clockwise direction as viewed in FIG. 3 to the position illustrated in FIG. 4. This rotation results in the periphery of the opening 16 being received in the undercut slots 24 and 25 described in FIG. 2 so that the leg is thoroughly locked to the pan.

In the rotated position illustrated in FIG. 4, it will be noted that the upwardly extending projection 26 faces towards the center of the pan 12, it being understood that the fragmentary portion of the pan 12 shown in FIG. 4 is in the same orientation as viewed in FIG. 1.

The other remaining legs 14 and 15 shown in FIG. 1 are similarly inserted into the corresponding openings 17 and 18, the legs thus being symmetrically disposed about the center of the pan with the upwardly extending projections 26 being furthest from the center.

With the foregoing arrangement, portions of the legs projecting above the surface of the pan 12 which constitute the T-shaped surface and the projection 26 are in positions to receive peripheral portions of the tank 10 when the tank 10 is seated into the pan.

Figure 5:
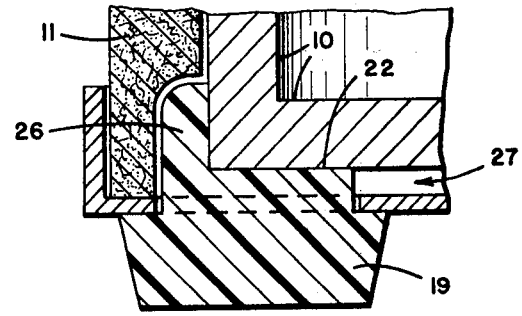

FIG. 5 shows in enlarged cross section the seating of one peripheral portion of the tank 10 on the leg 19. It will be noted that the upwardly projecting portion 26 serves to index the tank 10 into a central position in the pan 12. Further, the insulating jacket 11 can be positioned around the outer portion of the projection 26 as illustrated.

Finally, in FIG. 5 it will be noted that the leg actually supports the bottom of the tank 10 in spaced relationship to the bottom of the pan, this spacing being indicated at 27 so that there is no conductive contact between the tank 10 and the metallic pan itself.

In the preferred embodiment, only three legs are essential to provide stability in the support. However, further legs could be provided such as four or even a greater number.

The "height" of the legs is relatively nominal as illustrated in the drawings so as a consequence, the overall tank and leg structure is shorter than in the case of prior art legs which constituted metal irons welded onto the pan. This shorter leg structure permits smaller cartons to be used in shipping the hot water heaters since the overall length is reduced.

In addition to the foregoing, the legs of this invention as can readily be appreciated from the description provided avoid many problems associated with prior art type metal legs. First, there is not required any type of welding operation to affix the legs to the pan; rather, they can easily be mechanically locked by the geometry of the opening and the provision of the opposite slots in the leg structures themselves. Further, the legs being of heat insulation material such as rigid plastic prevent conduction or loss of heat from the tank to the pan and thence to the ground through the legs. Actually, the leg construction is such that the tank is insulated both from the pan and from the ground.

Finally, because of the relatively short length of the legs, the pan itself is fairly close to the ground resulting in higher convection currents of air passing thereunder to minimize heating of environmental areas by the tank.

The legs themselves are preferably integrally formed as described and can be made up in a single molding operation. Thus, they can be produced fairly inexpensively once the molds have been formed. Moreover, they can be manually removed and readily replaced by providing the non-circular type openings described in the pan structure.

From all of the foregoing, it will thus be evident that the present invention has provided improved supporting legs for tanks particularly hot water tanks.

We claim:

1. Supporting legs for a hot water tank wherein there is provided a bottom pan for said tank, each of said supporting legs comprising:

(a) a plastic body having a generally tapered cylindrical shape with a circular top surface, said top surface having an integrally formed raised portion in the shape of a T, the cross portion of the T being coextensive with a diameter of said top surface and the stem of the T terminating short of the circular periphery of the top surface by a given distance, the ends of said cross portions of the T having undercut slots each extending radially inwardly a distance at least equal to said given distance, and an upwardly extending integral projection adjacent to a mid part of said cross portion of the T on the side opposite said stem, said bottom pan having openings formed therein, the radius of each opening being less than the radius of said circular top surface of said plastic body by an amount no greater than said given distance, and each opening having diametrically opposite notches extending the opening in a diametric direction a distance at least equal to the diameter of the circular top surface of said plastic body, whereby the upraised cross portion of said T can be inserted upwardly through the bottom of said opening in said pan, the diametrically opposite ends of the cross portion of the T being received in the diametric opposite notches of the opening, and the plastic body then manually rotated to cause diametrically opposite peripheral edges of the opening in the pan to be received in said undercut slots thereby locking the plastic body to the pan, the upward projection and top surface of the T shape serving to receive and index a peripheral edge of a hot water tank relative to the other legs and thereby support the tank in a position insulated from said pan.

2. Supporting legs according to claim 1, in which each of said plastic bodies include diametrically opposite gripping flats on sides of the tapered cylindrical shape for manual gripping to facilitate rotation of the plastic bodies in the openings when securing the same to the pan.

3. Supporting legs according to claim 2, in which there are provided three supporting legs and three cooperating openings in said pan symmetrically spaced about the center of the pan to provide a three point support for the hot water tank.

* * * * *